(No Model.)
J. C. WADSWORTH.
COMBINED COTTON PLANTER AND FERTILIZER DISTRIBUTER.
No. 579,617. Patented Mar. 30, 1897.
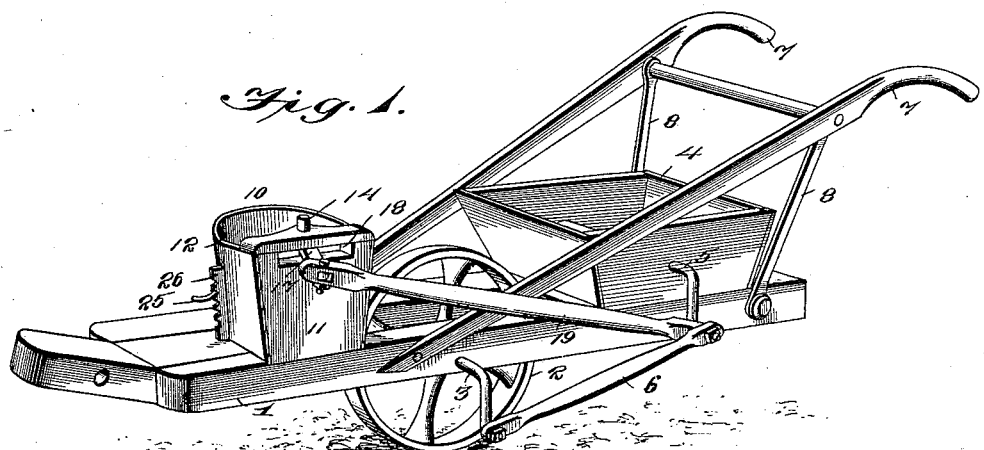
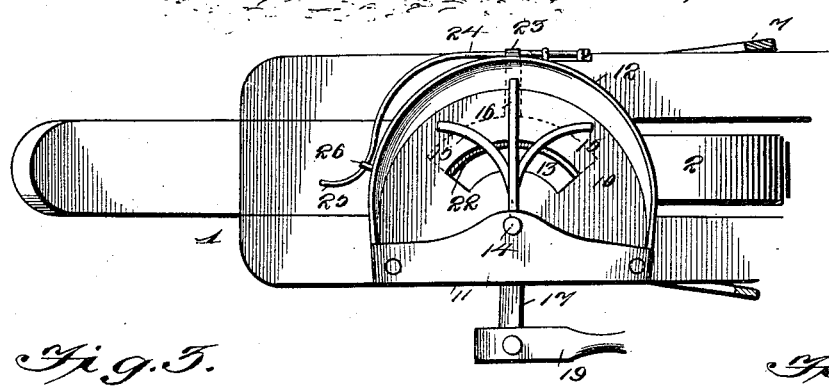
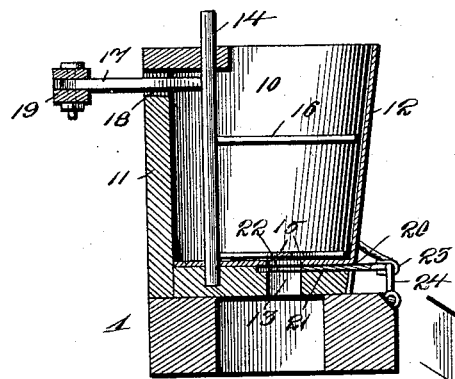
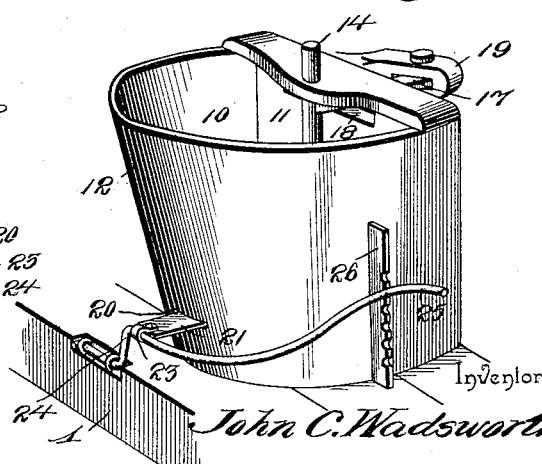

UNITED STATES PATENT OFFICE.

JOHN CYRENUS WADSWORTH, OF CONCORD, NORTH CAROLINA.

COMBINED COTTON-PLANTER AND FERTILIZER-DISTRIBUTER.

SPECIFICATION forming part of Letters Patent No. 579,617, dated March 30, 1897.

Application filed August 21, 1896. Serial No. 603,533. (No model.)

*To all whom it may concern:*

Be it known that I, JOHN CYRENUS WADSWORTH, a citizen of the United States, residing at Concord, in the county of Cabarrus and State of North Carolina, have invented a new and useful Combined Cotton-Planter and Fertilizer-Distributer, of which the following is a specification.

This invention relates to combined cotton-planters and fertilizer-distributers, the object being to provide, in connection with an ordinary planter, a fertilizer-distributer comprising a suitable hopper and an oscillatory agitator of special construction operatively connected to and actuated by the same mechanism which actuates the planter and arranged to traverse a segmental feed-opening, in connection with improved means for controlling the exposed area of the opening.

The invention consists in a combined planter and fertilizer-distributer embodying certain novel features and details of construction and arrangement of parts, as hereinafter fully described, illustrated in the drawings, and incorporated in the claim.

In the accompanying drawings, Figure 1 is a perspective view of the improved planter and fertilizer-distributer. Fig. 2 is a detail plan view showing the distributer. Fig. 3 is a cross-section taken through the hopper of the distributer in line with the agitator-shaft. Fig. 4 is a detail perspective view showing the means for regulating the discharge of the fertilizer from the hopper.

Similar numerals of reference designate corresponding parts in the several figures of the drawings.

Referring to the drawings, 1 designates the main longitudinal beam of an ordinary cotton-planter, said beam preferably comprising spaced parallel bars, between which is journaled the carrying and actuating wheel 2, the same being fast upon a crank-shaft 3, journaled in bearing-openings in said spaced bars. In rear of the wheel 2 is located the hopper 4 of the ordinary cotton-planter, the same containing an oscillating agitator mounted upon a crank-shaft 5, journaled in the side walls of such hopper. The crank-shafts 3 and 5 are connected by means of a link 6, so that as the actuating-wheel 2 is revolved by contact with the ground the crank-shaft 5 will be rocked and the agitator of the planter oscillated.

7 designates a pair of handles for guiding the machine, the same being connected by suitable braces 8 to the rear end of the beam 1.

In carrying out the present invention a second hopper 10 is mounted upon the beam 1 in advance of the hopper of the planter and also in advance of the wheel 2. This second hopper is preferably constructed with a flat side 11 and a rounded or substantially semicircular side or wall 12. This hopper may be of any desired material for resisting the action of the fertilizing material and is provided in its bottom with a segmental discharge-opening 13. Within the hopper 10 is arranged an agitator which comprises a substantially vertical shaft 14, mounted in bearings at its top and bottom ends in portions of the hopper and provided adjacent to the bottom of the hopper with a pair of curved and diverging fingers 15, which oscillate in a substantially horizontal plane just above the bottom of the hopper and over the segmental discharge-opening 13. These fingers serve to clear the discharge-opening and remove any obstructing material therefrom. One or more additional agitator-fingers 16 project from the shaft 14 in a plane higher than the fingers 15 for loosening the fertilizing material at higher points. The shaft 14 is provided with a crank-arm 17, which works through a slot 18 in the flat side wall of the hopper and connects pivotally with a link or pitman 19, the latter extending back and being mounted on the crank-shaft 5, above referred to. Thus when the crank-shaft 5 is rocked in the manner hereinabove described the rock-shaft 14 is correspondingly rocked, thus effecting an oscillation of the agitator-fingers within the hopper of the fertilizer-distributer.

At one side the hopper 10 is provided with a slot 20, through which operates a slide 21, having an expanded or widened inner end 22, which is adapted to be moved back and forth across the discharge-opening 13 for increasing or diminishing the size thereof, as may be required, for regulating the amount of fertilizer discharged from the hopper 10. The slide 21 is provided at its outer end with a bearing-sleeve 23, which embraces a crank-lever 24, having a terminal bearing portion journaled on the beam 1 and having its free end extended upon one side of the hopper 10 to form a spring-arm 25 for engaging any one of a series of notches in a vertical rack 26, supported by the hopper. Provision is thus made for partially or wholly opening or closing the discharge-opening in the hopper and holding the slide 21 fixed at any desired point.

The machine constructed as above described is very cheap and simple, is not liable to get out of order, and is reliable and effective in operation.

It will be apparent that various changes in the form, proportion, and minor details of construction may be resorted to without departing from the spirit or sacrificing any of the advantages of this invention.

Having thus described the invention, what is claimed as new is—

A combined cotton-planter and fertilizer-distributer having a hopper provided in its bottom with a segmental discharge-opening, an agitator having its shaft mounted in the hopper concentric with said opening and provided with divergent fingers to traverse the floor of the hopper contiguous to the opening, means for communicating oscillatory movement to the agitator, a cut-off slide of segmental construction arranged to close the discharge-opening and extending through a slot in the side of the hopper, a vertical rack secured exteriorly to the hopper, and a crank-lever fulcrumed at an intermediate point upon the projecting extremity of the slide, having a terminal bearing portion journaled upon a fixed object, and also having a spring-arm arranged in operative relation with said rack and normally held by its resilience in engagement with a depression thereof, substantially as specified.

In testimony that I claim the foregoing as my own I have hereto affixed my signature in the presence of two witnesses.

JOHN CYRENUS WADSWORTH.

Witnesses:
  R. H. PARKER,
  D. B. COLTRANE.